(12) United States Patent
Bader

(10) Patent No.: US 6,547,612 B1
(45) Date of Patent: Apr. 15, 2003

(54) DEVICE FOR TRANSMITTING TORQUE IN THE POWER TRAIN OF A WATERCRAFT HAVING AN INTERNAL COMBUSTION ENGINE

(75) Inventor: Thomas Bader, Wolfenbuettel (DE)

(73) Assignee: Volkswagen AG, Wolfburg/Fallersleben (DE)

( * ) Notice: Subject to any disclaimer, the term of this patent is extended or adjusted under 35 U.S.C. 154(b) by 0 days.

(21) Appl. No.: 09/698,731

(22) Filed: Oct. 27, 2000

(30) Foreign Application Priority Data

Oct. 29, 1999 (DE) .......................... 199 52 233

(51) Int. Cl.[7] .......................... B63H 23/00; B63H 23/02
(52) U.S. Cl. .............................. 440/75; 440/83; 464/68
(58) Field of Search .............................. 440/75, 83, 52; 464/68

(56) References Cited

U.S. PATENT DOCUMENTS

| | | | | |
|---|---|---|---|---|
| 4,723,463 A | * | 2/1988 | Reik et al. .............. | 192/213.21 |
| 4,932,286 A | * | 6/1990 | Fukushima | |
| 4,938,723 A | | 7/1990 | Yoshimura et al. | |
| 5,065,642 A | * | 11/1991 | Kagiyama | |
| 5,195,396 A | * | 3/1993 | Kamiya et al. | |
| 5,205,788 A | * | 4/1993 | Sacher et al. | |
| 5,545,089 A | * | 8/1996 | Kirschey | |
| 5,957,740 A | | 9/1999 | Matsuda et al. | |

FOREIGN PATENT DOCUMENTS

| | | |
|---|---|---|
| DE | 1 096 792 | 1/1961 |
| DE | 39 15 527 | 11/1990 |
| DE | 43 09 745 | 9/1994 |

OTHER PUBLICATIONS

X—Roddewig et al. "Digitale Simulation von nichtllineaer hydraulisch gedampfen Federkupplungen", Antriebstechnik 28, 1989, No. 10, pp. 38–43.

X–cited in German counterpart Search Report—which is attached hereto.

* cited by examiner

*Primary Examiner*—Sherman Basinger
(74) *Attorney, Agent, or Firm*—Kenyon & Kenyon

(57) ABSTRACT

Torque fluctuations, which, on one hand, come from the engine, and on the other hand, come from the power take-off side due to the effect of the rudder and beating of the blade, and which are primarily caused by the typically low rotational speed in drives of watercraft, lead to intense vibrations in the hull and generate. noise. A device for transmitting torque in the power train of a watercraft damps torsional vibrations occurring in the power train of a watercraft and, therefore, ensures low-noise and low-vibration operation. The device includes an engine-side, primary flywheel mass, a secondary flywheel mass coupled at the power take-off to a gearbox driving the ship propeller, as well as a torsionally elastic connection disposed therebetween. The special requirements in the power train of a watercraft are satisfied by a secondary flywheel mass, which is coupled to the shaft on the output end and has a high mass moment of inertia, as well as by a large torsion angle between the primary and secondary flywheel masses, which is rendered possible by the design of the elastic coupling.

25 Claims, 2 Drawing Sheets

DEVICE FOR TRANSMITTING TORQUE IN THE POWER TRAIN OF A WATERCRAFT HAVING AN INTERNAL COMBUSTION ENGINE

FIELD OF THE INVENTION

The present invention relates generally to a device for transmitting torque in the power train of a watercraft.

BACKGROUND INFORMATION

German Published Patent Application No. 39 15 527 describes a torsional vibration damper for a boat gear, which includes a primary flywheel mass on the engine side, and an elastically coupled secondary part that is formed as a hub and is rigidly connected to the marine gear. The coupling allows the flywheel to twist relative to the secondary part coupled to the marine gear. Springs disposed in the flywheel and axially supported against it in the direction of the outer diameter act on sliding elements, which are supported at inclined, plane surfaces formed on the outer contour of the hub. A friction disk acting between the flywheel and the secondary part is provided for damping the vibrations. The design necessitates the torsional vibration damper having a torsion angle of less than 45° between the flywheel and the secondary part. There is only a small resistance to the relative twisting of the flywheel and secondary part, up to contacting the limit-position damper.

In addition, an elastic shaft coupling for boat engines, which is very similar to conventional rubber roller clutches, is described in German Published Patent Application No. 43 09 745. In order to transmit torque, elastically deformable, molded articles are arranged in the spaces between the coupling flange and a hub. At the power take-off side, a power transmission element, which is rigidly coupled to the hub and the claws of which engage with recesses of the coupling flange, is disposed on the coupling flange. For this coupling, dimensioning the output-end power transmission element beyond its required strength is recommended to form a flywheel.

Torsionally elastic couplings, which are generally used for marine gears and for damping torsional vibrations, only allow a small torsion angle between the engine and the gearbox. The damping of torsional vibrations is not satisfactory for these conventional solutions. This is particularly apparent in the case of low engine speeds typical for ships, for example, in harbor maneuvers or passing through a lock. Clearly noticeable vibrations occur in the hull, as well as high levels of driving noise. In addition to the torsional vibrations caused by the drive, torsional vibrations also originate at the propeller in propeller drives for watercraft. These torsional vibrations are formed due to hydrodynamic changes in response to a ship propeller blade racing near the adjacent hull. In this instance, the smaller torque occurring at the ship propeller generates torsional vibrations, which are dependent on engine speed and known as "beating of the blade." In addition, the effect of the rudder position also contributes to the fluctuation of the torque at the power take-off.

German Published Patent Application No. 39 15 527 describes the use of hydraulically damped, dual-mass flywheels as dynamic vibration absorbers. However, such systems are considered to be too expensive.

For the shaft coupling described, for example, in German Published Patent Application No. 43 09 745, a power transmission element disposed on the power take-off side is dimensioned to have an increased mass moment of inertia.

SUMMARY

The present invention relates to a device for transmitting torque, which is adjusted to the conditions in the power train of a watercraft, is arranged between the engine and the gearbox, is structurally separated from the coupling or clutch, and has an elastically coupled output-end flywheel mass possessing a high mass moment of inertia. This permits a large torsion angle between the drive-end and output-end flywheel masses while simultaneously providing a high degree of damping.

It is an object of the present invention to provide a device for transmitting torque in the power train of a watercraft, which damps these typical torsional vibrations in the power train.

The device of the present invention for transmitting torque in the power train of a water craft, which may be driven by an internal combustion engine, has a first flywheel mass arranged on the crankshaft of the internal combustion engine and a second flywheel mass rigidly coupled to the transmission line of the ship drive. The first and second flywheel masses are interconnected in a torsionally elastic manner. The response characteristic of the device according to the present invention can be optimally set for damping torsional vibrations, using the stiffness parameters of the elastic connection, its damping capacity, and the coupled flywheel masses. The second flywheel mass has a high mass moment of inertia and is arranged on the power take-off side of the device. Thus, a large torsion angle between the first and second flywheel masses is possible. Torsional vibrations resulting from torque fluctuations of the engine, as well as from the effect of the power take-off, are effectively damped. Vibrations and noises are already damped from the starting engine speed. The gearbox no longer rattles in almost all engine-speed ranges. Reducing the rotational irregularities subjects the entire power train to smaller mechanical loadings, thereby increasing its service life. A further advantage of the device according to the present invention is that the elimination of the need for the torsional vibration damper on the clutch disk allows the gears to be shifted more easily because of the smaller masses to be synchronized.

In addition to the high level of driving comfort and smooth shifting, less wear reduces costs.

DETAILED DESCRIPTION

Figure 1:
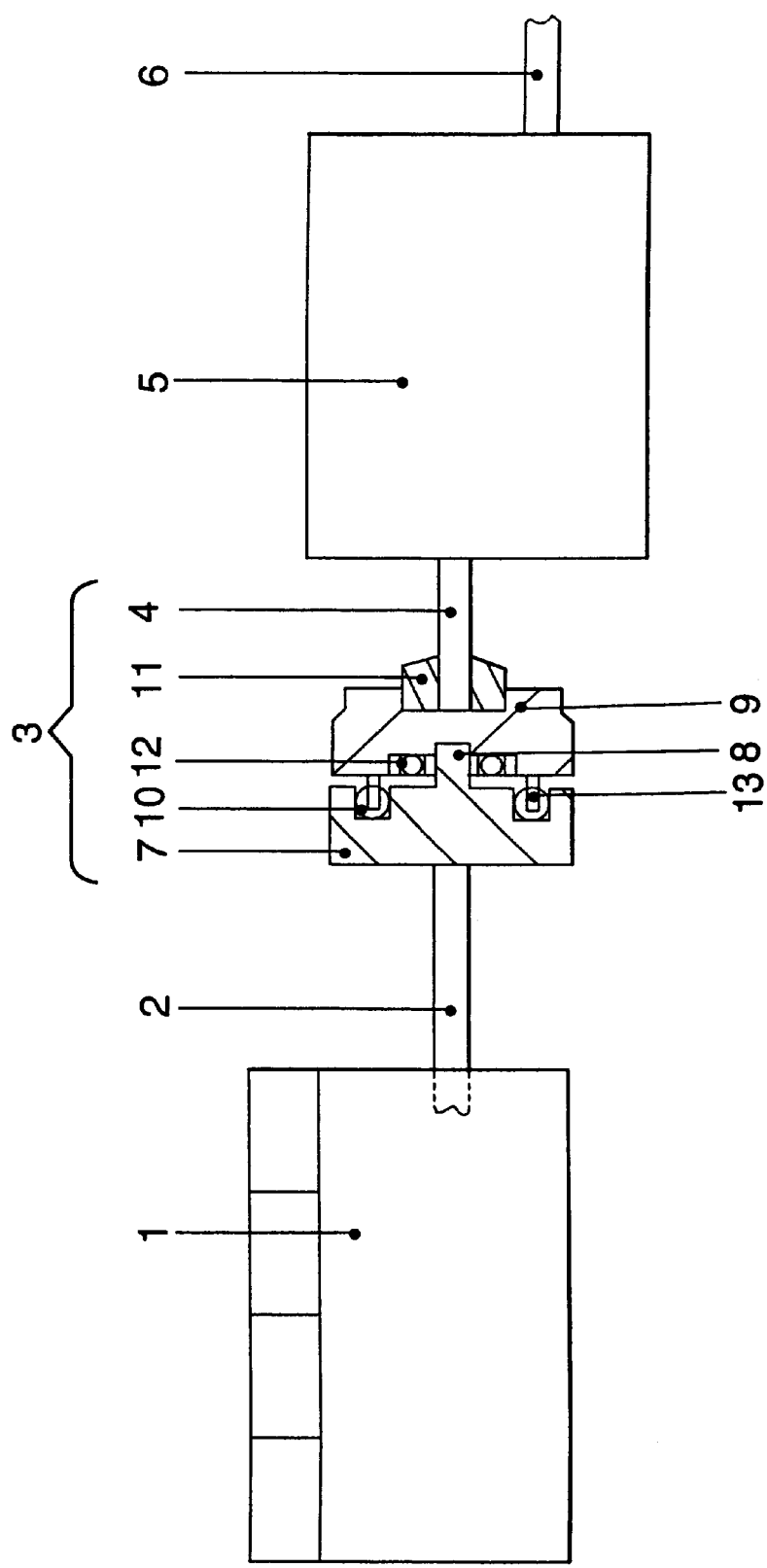
FIG. 1 is a schematic view of the device according to the present invention.

FIG. 1 is a schematic view of the device according to the present invention. A device for transmitting torque is interconnected between crankshaft 2 of a marine engine 1 and power take-off shaft 4 leading to gearbox 5 of the marine engine. This device is formed from a dual-mass flywheel 3. The power take-off side of gearbox 5 has a drive shaft 6 along with a ship propeller drive, not shown.

Dual-mass flywheel 3 includes a primary flywheel mass 7, which is rigidly coupled to crankshaft 2 of engine 1, and a secondary flywheel mass 9, which is rotationally mounted on primary flywheel mass hub 8 via a ball bearing 12. Primary flywheel mass 7 carries circumferentially distributed springs 10, which may be compression springs. Coupling elements 13 rigidly connected to secondary flywheel mass 9 mate with these springs and are therefore supported against primary flywheel mass 7 through the interpositioning of springs 10.

Force is transmitted from crankshaft 2 to primary flywheel mass 7 and then transmitted further, via springs 10 retained therein, to coupling elements 13 rigidly mounted to secondary flywheel mass 9. Thus, force is transmitted to secondary flywheel mass 9. Attached to this secondary flywheel mass 9 is an interchangeable shaft.adapter 11, through which the forces are further transmitted to shaft 4 driving the gears. The fit of the connection between secondary flywheel mass 9 and shaft 4 of gearbox 5 is achieved in a simple manner by shaft adapter 11.

Figure 2:
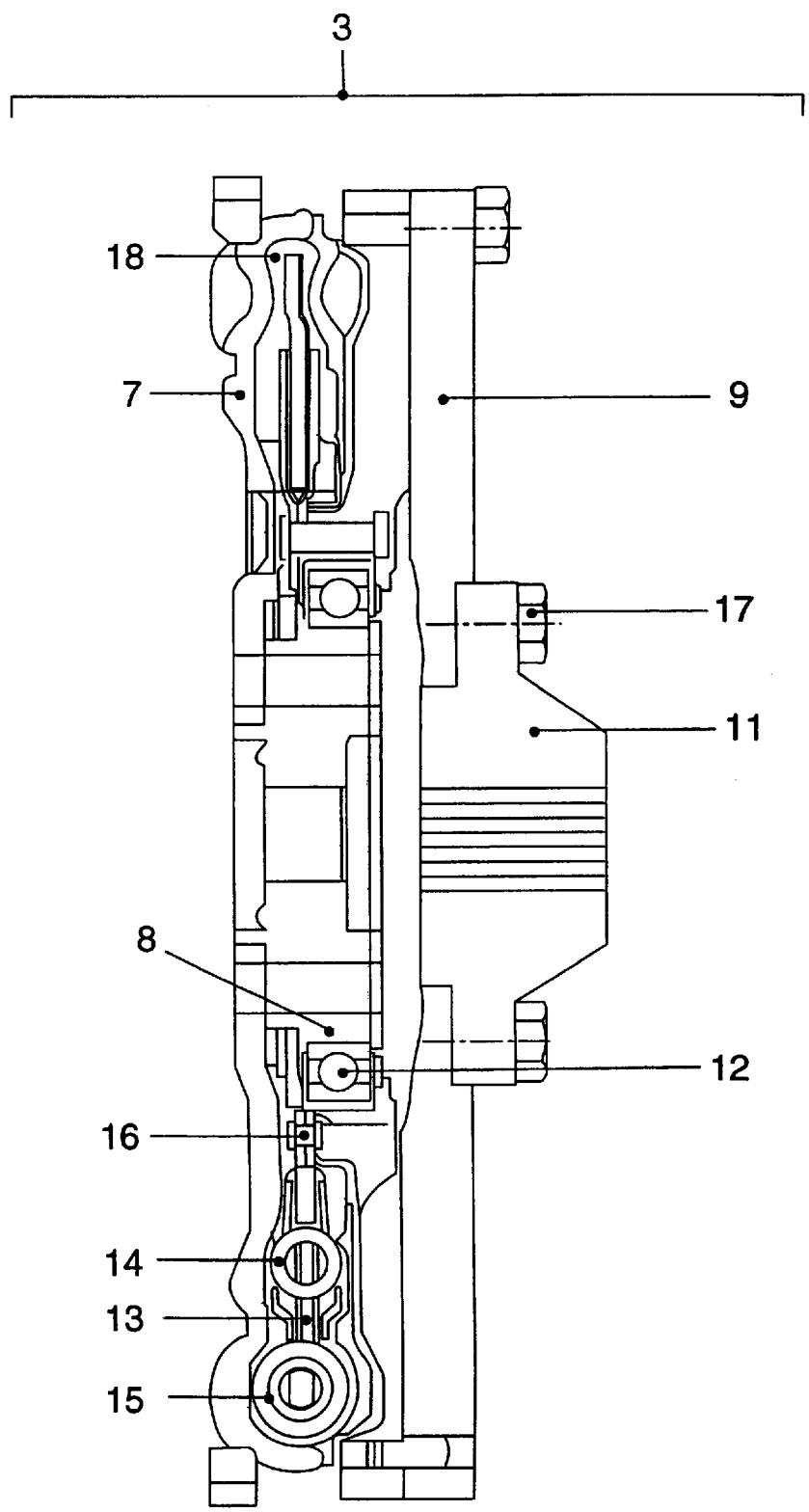
FIG. 2 is a cross-sectional view of an exemplary embodiment of the device according to the present invention.

A partial cross-sectional view of an exemplary embodiment of the device according to the present invention is illustrated in FIG. 2. FIG. 2 illustrates a dual-mass flywheel 3, which has a secondary flywheel mass 9 designed for use in the power train of a watercraft and permits a large torsion angle between the flywheel masses. The torsion angle may be permitted to exceed, for example 30°.

Secondary flywheel 9 is rotationally mounted on hub 8 of primary flywheel 7 via a ball bearing 12. Coupling element 13 is rigidly connected to secondary flywheel 9 by connecting elements 16. Coupling elements 13 mate with circumferentially distributed spring elements 14 and 15 distributed about the circumference, which are retained in primary flywheel 7 and are radially supported against primary flywheel 7. A shaft adapter 11 is concentrically mounted on secondary flywheel 9, via connecting elements 17, so as to be interchangeable. The shaft adapter 11 is used to attach shaft 4, which leads to gearbox 5.

What is claimed is:

1. A device for transmitting torque in a power train of a watercraft, comprising:
    an engine-side, primary flywheel mass configured to couple to a marine engine arranged in the watercraft;
    a power take-off shaft configured to couple to a gearbox arranged in the watercraft; and
    a torsionally elastic connection arranged between the primary flywheel mass and the power take-off shaft, the torsionally elastic connection including a secondary flywheel mass coupled to the power take-off shaft and at least one spring element engaging the primary flywheel mass and the secondary flywheel mass.

2. The device according to claim 1, wherein the spring element is at least indirectly held between the primary flywheel mass and the secondary flywheel mass.

3. The device according to claim 1, wherein the spring element includes a helical spring.

4. The device according to claim 1, wherein the spring element is arranged to act in a circumferential direction.

5. The device according to claim 1, wherein the spring element includes a compression spring.

6. The device according to claim 1, further comprising a ball bearing, the secondary flywheel mass rotationally connected to the primary flywheel mass via the ball bearing.

7. The device according to claim 6, wherein the ball bearing is mounted on a hub of the primary flywheel mass.

8. The device according to claim 1, wherein the at least one spring element includes a plurality of circumferentially arranged spring elements.

9. The device according to claim 1, wherein the secondary flywheel mass includes at least one coupling element engaging a respective spring element.

10. The device according to claim 1, wherein the marine engine includes an internal combustion engine.

11. The device according to claim 1, wherein the torsionally elastic connection is configured to permit a torsion angle of >30°.

12. The device according to claim 1, further comprising an interchangeable shaft adapter mounted concentrically on the secondary flywheel mass and coupleable to the power take-off shaft.

13. The device according to claim 1, wherein the secondary flywheel mass includes a high mass moment of inertia.

14. A device for transmitting torque in a power train of a watercraft, comprising:
    an engine-side, primary flywheel mass configured to couple to a marine engine arranged in the watercraft;
    a power take-off shaft configured to couple to a gearbox arranged in the watercraft; and
    a torsionally elastic connection arranged between the primary flywheel mass and the power take-off shaft, the torsionally elastic connection including a secondary flywheel mass coupled to the power take-off shaft and at least one compression spring element engaging the primary flywheel mass and the secondary flywheel mass.

15. The device according to claim 14, wherein the spring element is at least indirectly held between the primary flywheel mass and the secondary flywheel mass.

16. The device according to claim 14, wherein the spring element includes a helical spring.

17. The device according to claim 14, wherein the spring element is arranged to act in a circumferential direction.

18. The device according to claim 14, further comprising a ball bearing, the secondary flywheel mass rotationally connected to the primary flywheel mass via the ball bearing.

19. The device according to claim 18, wherein the ball bearing is mounted on a hub of the primary flywheel mass.

20. The device according to claim 14, wherein the at least one compression spring element includes a plurality of circumferentially arranged compression spring elements.

21. The device according to claim 14, wherein the secondary flywheel mass includes at least one coupling element engaging a respective spring element.

22. The device according to claim 14, wherein the marine engine includes an internal combustion engine.

23. The device according to claim 14, wherein the torsionally elastic connection is configured to permit a torsion angle of >30°.

24. The device according to claim 14, further comprising an interchangeable shaft adapter mounted concentrically on the secondary flywheel mass and coupleable to the power take-off shaft.

25. The device according to claim 14, wherein the secondary flywheel mass includes a high mass moment of inertia.

* * * * *

UNITED STATES PATENT AND TRADEMARK OFFICE
CERTIFICATE OF CORRECTION

PATENT NO.    : 6,547,612 B1
DATED         : April 15, 2003
INVENTOR(S)   : Thomas Bader It is certified that error appears in the above-identified patent and that said Letters Patent is hereby corrected as shown below:

<u>Title page,</u>
Item [73], Assignee, should read:
-- Volkswagen AG, Wolfsburg/Fallersleben, Germany --.

Signed and Sealed this

Twenty-sixth Day of August, 2003

JAMES E. ROGAN
*Director of the United States Patent and Trademark Office*